(12) United States Patent
Olgaard

(10) Patent No.: US 9,002,290 B2
(45) Date of Patent: Apr. 7, 2015

(54) SYSTEM AND METHOD FOR TESTING A RADIO FREQUENCY (RF) MULTIPLE-INPUT-MULTIPLE-OUTPUT (MIMO) DEVICE UNDER TEST (DUT)

(75) Inventor: Christian Volf Olgaard, Saratoga, CA (US)

(73) Assignee: Litepoint Corporation, Sunnyvale, CA (US)

( * ) Notice: Subject to any disclaimer, the term of this patent is extended or adjusted under 35 U.S.C. 154(b) by 285 days.

(21) Appl. No.: 13/467,518

(22) Filed: May 9, 2012

(65) Prior Publication Data

US 2013/0301694 A1 Nov. 14, 2013

(51) Int. Cl.
*H04B 17/00* (2006.01)
*H04B 7/04* (2006.01)

(52) U.S. Cl.
CPC .......... *H04B 7/0413* (2013.01); *H04B 17/0085* (2013.01); *H04B 17/29* (2013.01)

(58) Field of Classification Search
CPC .............................. H04B 7/0413; H04B 17/00
USPC ...................... 455/67.14, 67.12, 67.16, 67.11; 370/332
See application file for complete search history.

(56) References Cited

U.S. PATENT DOCUMENTS

| 7,706,250 | B2 | 4/2010 | Olgaard et al. |
| 7,822,130 | B2* | 10/2010 | Walvis et al. ................. 375/260 |
| 7,948,254 | B2 | 5/2011 | Olgaard et al. |
| 2011/0096821 | A1* | 4/2011 | Olgaard et al. ............... 375/224 |
| 2011/0299570 | A1 | 12/2011 | Reed |
| 2012/0100813 | A1 | 4/2012 | Mow et al. |

FOREIGN PATENT DOCUMENTS

KR 10-2010-0016261 A 2/2010

OTHER PUBLICATIONS

International Search Report Dated May 31, 2013, for PCT/US2013/026250; 4 Pages.
Written Opinion Dated May 30, 2013, for PCT/US2013/026250; 4 Pages.

\* cited by examiner

*Primary Examiner* — Nay A Maung
*Assistant Examiner* — Angelica M Perez
(74) *Attorney, Agent, or Firm* — Vedder Price, P.C.

(57) ABSTRACT

A system and method for testing a radio frequency (RF) multiple-input-multiple-output (MIMO) device under test (DUT) in which system costs are minimized by using fewer precision RF MIMO testing subsystems together with lower precision integrated RF MIMO signal conversion circuitry to test the DUT.

18 Claims, 5 Drawing Sheets

SYSTEM AND METHOD FOR TESTING A RADIO FREQUENCY (RF) MULTIPLE-INPUT-MULTIPLE-OUTPUT (MIMO) DEVICE UNDER TEST (DUT)

BACKGROUND

The present invention relates to testing wireless devices that employ multiple-input-multiple-output (MIMO) signal technology.

Many advanced wireless devices employ MIMO technology as a way to increase range or increase data throughput. In MIMO, a device will typically have multiple transmitters and receivers. If the same data is sent using multiple transmitters via the same channel, and received via multiple receivers, the effective operating range can be increased compared to a device sending the data using a single transmitter and single receiver.

If a data to be sent in a single stream is divided up into distinct and separate streams and sent simultaneously by multiple transmitters using multiple antennas via the same channel; and that data is received by multiple receivers using multiple receive antennas; it can be signal processed and decoded into the distinct and separate streams, then recombined, effectively increasing the throughput by having sent two or more simultaneous streams of data using the same channel.

Devices that use MIMO technology for increased range or throughput are tested against a wireless standard's prescribed test for such characteristics as sensitivity, error rates, and modulation quality (e.g. error vector magnitude or EVM). One testing innovation involves simultaneous transmission of data-packet signals by multiple transmitters and the combining of the distinct data-packet signals into a composite data-packet signal. If that composite signal can be evaluated much as a single signal produced by a single transmitter, the test time would be comparable, but only requiring a single VSA to perform the measurements thus lowering the cost. Composite testing is known in the art (U.S. Pat. No. 7,948,254—Digital Communications Test System for Multiple Input, Multiple Output (MIMO) Systems; and U.S. Pat. No. 7,706,250 Apparatus and Method for Simultaneous Test of Multiple Orthogonal Frequency Devision Multiplexed Transmitters with Single Vector Signal Analyzer), but some additional requirements are needed to make this technology work. The data pattern must be known and only direct-mapped signals are supported if power measurement is to be included.

However, MIMO devices having three or more transmitters and receivers (e.g. 3×3 or 4×4 MIMO device) makes using this composite-signal approach less attractive because direct mapping is required to analyze the power. A 2×2 MIMO system derives no real benefit in utilizing spatial mapping, but when you have fewer streams than transmitters (e.g. two streams and three transmitters), the device will normally force the use of spatially mapped signals, as it enables equal transmit power for each stream while utilizing all available transmitters. While it is still possible to measure composite EVM for spatially mapped signals, one cannot measure individual transmitter power when streams are spatially separated. Naturally, one can use direct mapping using the highest data rates during test in a cabled environment (e.g. where the individual transmitters are connected through a combiner or switch to a tester's VSA), but many data rates and corresponding power levels will not be supported if using composite measurement. More importantly, with over-the-air (OTA) testing, one cannot maintain direct mapping as the signals will combine in the air. Even 2×2 devices will have problems in OTA test as direct mapping cannot be maintained.

Consequently, in testing MIMO devices with 3×3 configurations or higher, in the absence of practical and comprehensive composite-signal testing, one is faced with using a multi-VSA solution in order to obtain the needed analysis capability. In other words, one would have, say, three expensive high-performance VSAs to test a device having three transmitters. Similarly, for conducting RX tests on a device having three receivers, where discrete signals sent to each RX antenna are tested for true MIMO signal characteristics, it would also require three expensive high-performance VSGs.

Accordingly, it would be desirable to overcome this limitation by combining a composite EVM testing approach with a low-cost transceiver add on to address the limitations of composite EVM and three-receiver tests addressed above.

SUMMARY

In accordance with the presently claimed invention, a system and method are provided for testing a radio frequency (RF) multiple-input-multiple-output (MIMO) device under test (DUT) in which system costs are minimized by using fewer precision RF MIMO testing subsystems together with lower precision integrated RF MIMO signal conversion circuitry to test the DUT.

In accordance with one embodiment of the presently claimed invention, a system for testing a radio frequency (RF) multiple-input-multiple-output (MIMO) device under test (DUT) includes:
  a plurality of RF signal ports to convey a corresponding plurality of MIMO signals, including a plurality of transmit test MIMO signals received from a DUT;
  signal routing circuitry coupled to the plurality of RF signal ports to provide
    a plurality of replica MIMO signals corresponding to the plurality of transmit test MIMO signals, and
    a composite signal including the plurality of transmit test MIMO signals;
  first signal processing circuitry coupled to the signal routing circuitry to provide one or more processed signals by processing at least one of
    the composite signal, and
    a first portion of the plurality of replica MIMO signals;
  signal conversion circuitry coupled to the signal routing circuitry to convert a second portion of the plurality of replica MIMO signals to provide one or more converted signals;
  second signal processing circuitry coupled to the first signal processing circuitry and the signal conversion circuitry to process the one or more processed signals and the one or more converted signals to provide test data indicative of one or more signal transmission performance parameters of the DUT.

In accordance with another embodiment of the presently claimed invention, a system for testing a radio frequency (RF) multiple-input-multiple-output (MIMO) device under test (DUT) includes:
  a plurality of RF signal ports to convey a corresponding plurality of MIMO signals, including a plurality of receive test MIMO signals for transmission to a DUT;
  first RF signal generating circuitry to provide a first portion of the plurality of receive test MIMO signals;
  second RF signal generating circuitry to provide a RF transmit signal; and
  signal routing circuitry, coupled between the first and second RF signal generating circuitries and the plurality of RF signal ports, to provide the plurality of receive test MIMO signals, wherein the plurality of receive test MIMO signals corresponds to one or more of the first portion of the plurality of receive test MIMO signals, and the RF transmit signal.

In accordance with another embodiment of the presently claimed invention, a method of testing a radio frequency (RF) multiple-input-multiple-output (MIMO) device under test (DUT) includes:

receiving, via a plurality of RF signal ports, a corresponding plurality of MIMO signals, including a plurality of transmit test MIMO signals, from a DUT;

routing the plurality of transmit test MIMO signals from the plurality of RF signal ports to provide a plurality of replica MIMO signals corresponding to the plurality of transmit test MIMO signals, and a composite signal including the plurality of transmit test MIMO signals; providing one or more processed signals by processing at least one of the composite signal, and a first portion of the plurality of replica MIMO signals;

converting a second portion of the plurality of replica MIMO signals to provide one or more converted signals;

processing the one or more processed signals and the one or more converted signals to provide test data indicative of one or more signal transmission performance parameters of the DUT.

In accordance with another embodiment of the presently claimed invention, a method of testing a radio frequency (RF) multiple-input-multiple-output (MIMO) device under test (DUT) includes:

generating a first plurality of RF signals to provide a first portion of a plurality of receive test MIMO signals;

generating a RF transmit signal; and routing the first portion of a plurality of receive test MIMO signals and the RF transmit signal to provide the plurality of receive test MIMO signals to a plurality of RF signal ports for transmission to a DUT, wherein the plurality of receive test MIMO signals corresponds to one or more of the first portion of the plurality of receive test MIMO signals, and the RF transmit signal.

DETAILED DESCRIPTION

Figure 1:
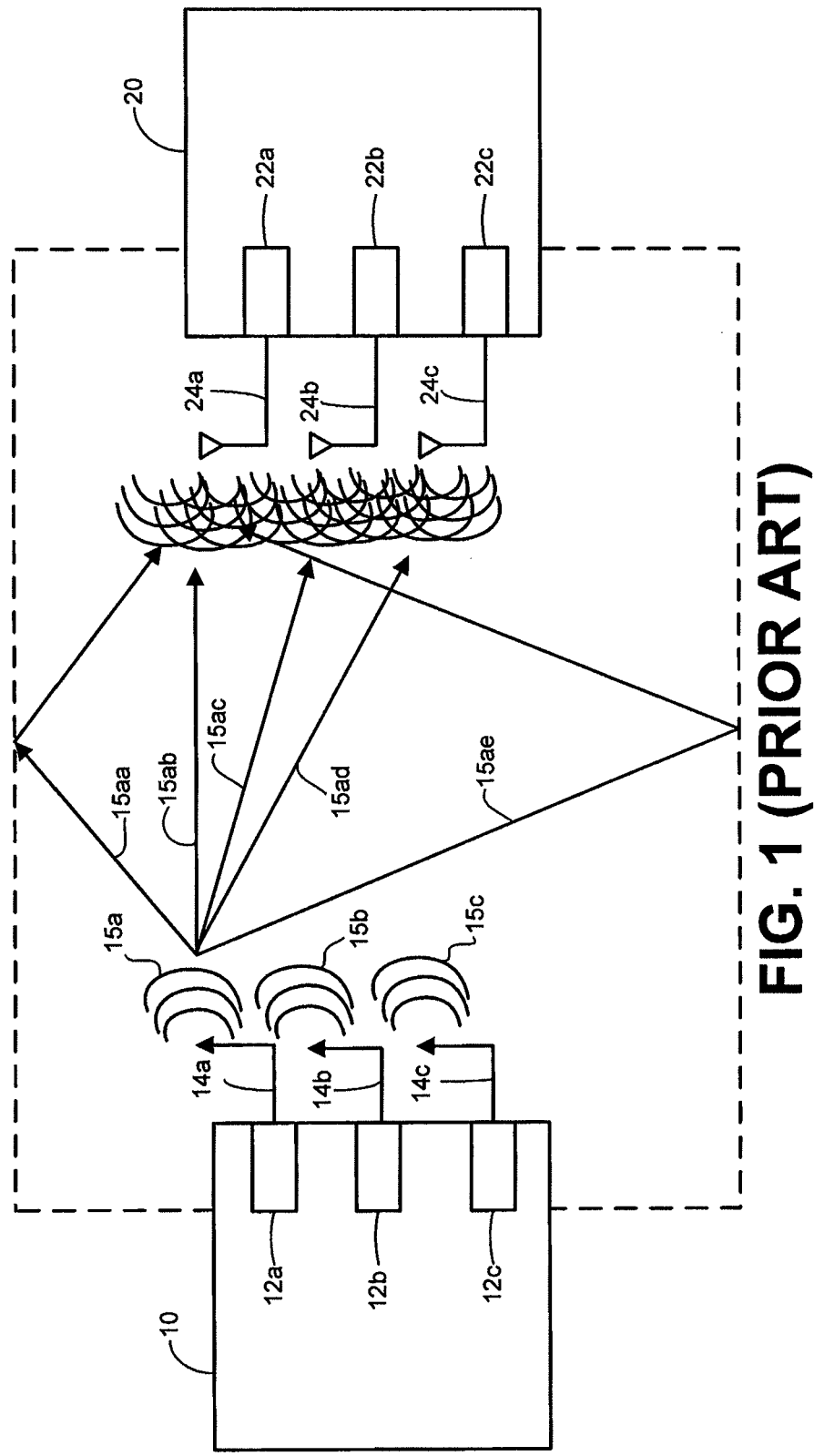
FIG. 1 depicts conventional wireless communication between two 3×3 MIMO devices.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, electromagnetic waves or a data signal. Within the drawings, like or related elements will have like or related alpha, numeric or alphanumeric designators. References to specific subsystems, such as a power combiner, or analog-to-digital converter, refers to the structure and function of such a subsystem without restricting its implementation to one of discrete or integrated components. It should be understood that any practical implementation method could be used and no preference is suggested or implied. All embodiments are meant to be exemplary and should not be construed as limiting the invention to those specific exemplary descriptions. Moreover, to the extent that the figures illustrate diagrams of the functional blocks of various embodiments, the functional blocks are not necessarily indicative of the division between hardware circuitry.

As discussed in more detail below, as a practical alternative solution to using multiple VSAs and VSGs to fully test MiMo devices having three or more transmitters and receivers, the invention to be described uses a single high-performance VSA and single high-performance VSG in conjunction with multiple chip-level transceivers operating in parallel. The chip-level transceivers lacking sufficient signal-to-noise ratio (SNR) cannot be used to measure tester-grade EVM., but they can decode the transmitted packets. Similarly, the signals they would send in an RX test would not have the power accuracy of a high-performance VSG but they would enable testing whether those receivers can receive a true MIMO signal.

If the transceivers can perform a packet down convert and filter these signals, then these chip-level transceivers can capture the individual signals emitted by each transmitter, analyze them for power (both transmitter and 'stream' power), and CCDF. And, by combining the individual captures, the received signal can be decoded to permit composite-signal EVM and mask testing using the single, high-performance VSA. In addition, this invention enables one to determine the isolation between the transmitters in a direct-mapped cabled setup. One additional benefit for doing this is one no longer would need to have the transmitter data beforehand, that is, one would not have to "map" the transmitters because the packet can be decoded using the chip-level signals.

In an RX test, the transceivers in conjunction with memory and processor will use wave tables to create baseband signals where outputs are level-controlled and fed to the RX receiver ports to determine if the receivers can receive true MIMO signals.

Referring to FIG. 1, a typical MIMO device 10 (e.g., a wireless Internet/Ethernet router) includes three transceiver circuits (with respective transmitters and receivers) 12a, 12b, 12c for sending and receiving data packets simultaneously. Generally, the transmitter portions of these transceiver circuits, 12a, 12b, 12c send the same data packets simultaneously, producing corresponding radio frequency (RF) signals 15*a*, 15*b*, 15*c* for transmission via associated antennas 14*a*, 14*b*, 14*c*. Well known MIMO technology will also support sending mutually distinct data packets simultaneously, in which case, the resulting RF signals 15*a*, 15*b*, 15*c* will also be mutually distinct. In the case of sending identical data packets, the objective is to achieve greater range of signal transmission due to more reliable reception. In the case of mutually distinct data packets, the objective is to increase data throughput. In either case, another MIMO device 20 with its own transceivers 22*a*, 22*b*, 22*c* will receive, via associated antennas 24*a*, 24*b*, 24*c*, the resulting multipath RF signals 15*aa*, 15*ab*, 15*ac*, 15*ad*, 15*ae* containing the data packets.

Figure 2:
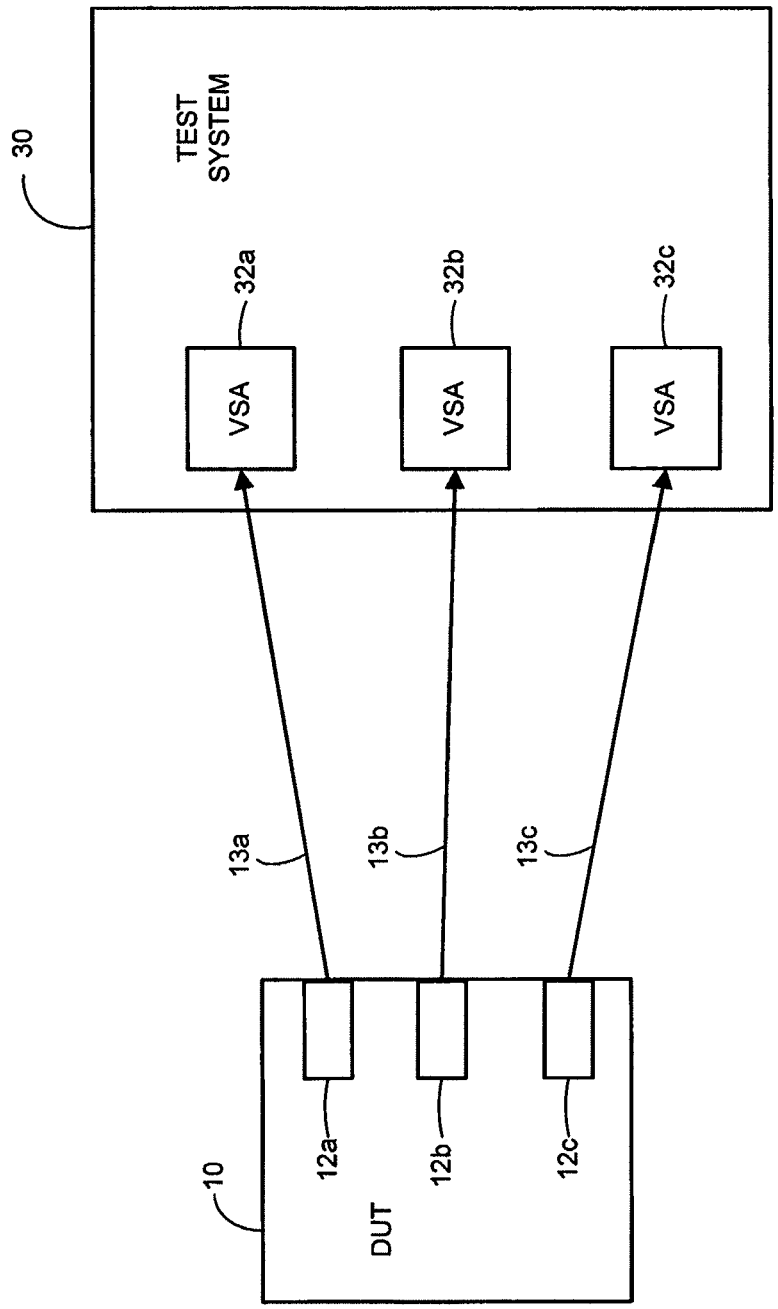
FIG. 2 depicts a conventional test system with three high-performance vector signal analyzers (VSAs) for testing a wireless MIMO DUT.

Referring to FIG. 2, a conventional technique for testing such a MIMO device 10 includes the use of a test system 30 with multiple (e.g., three in the case of a 3×3 MIMO device 10) high performance vector signal analyzers (VSAs) 32*a*, 32*b*, 32*c*. Such a system 30 provides for the testing of each individual transmitter 12*a*, 12*b*, 12*c*, preferably via a wired signal connection 13*a*, 13*b*, 13*c* to ensure individual signal isolation. This allows for testing of all physical characteristics of each transmitter 12*a*, 12*b*, 12*c*, based on testing criteria prescribed by the applicable wireless RF signal standard. (Alternatively, the signal paths 13*a*, 13*b*, 13*c* can be wireless for over the air (OTA) testing, in which case direct signal mapping cannot be achieved, but the physical characteristics of each transmitter 12*a*, 12*b*, 12*c* can still be tested.) A disadvantage of such a system 30, however, involves the cost of the multiple high performance VSA subsystems 32*a*, 32*b*, 32*c*.

Figure 3:
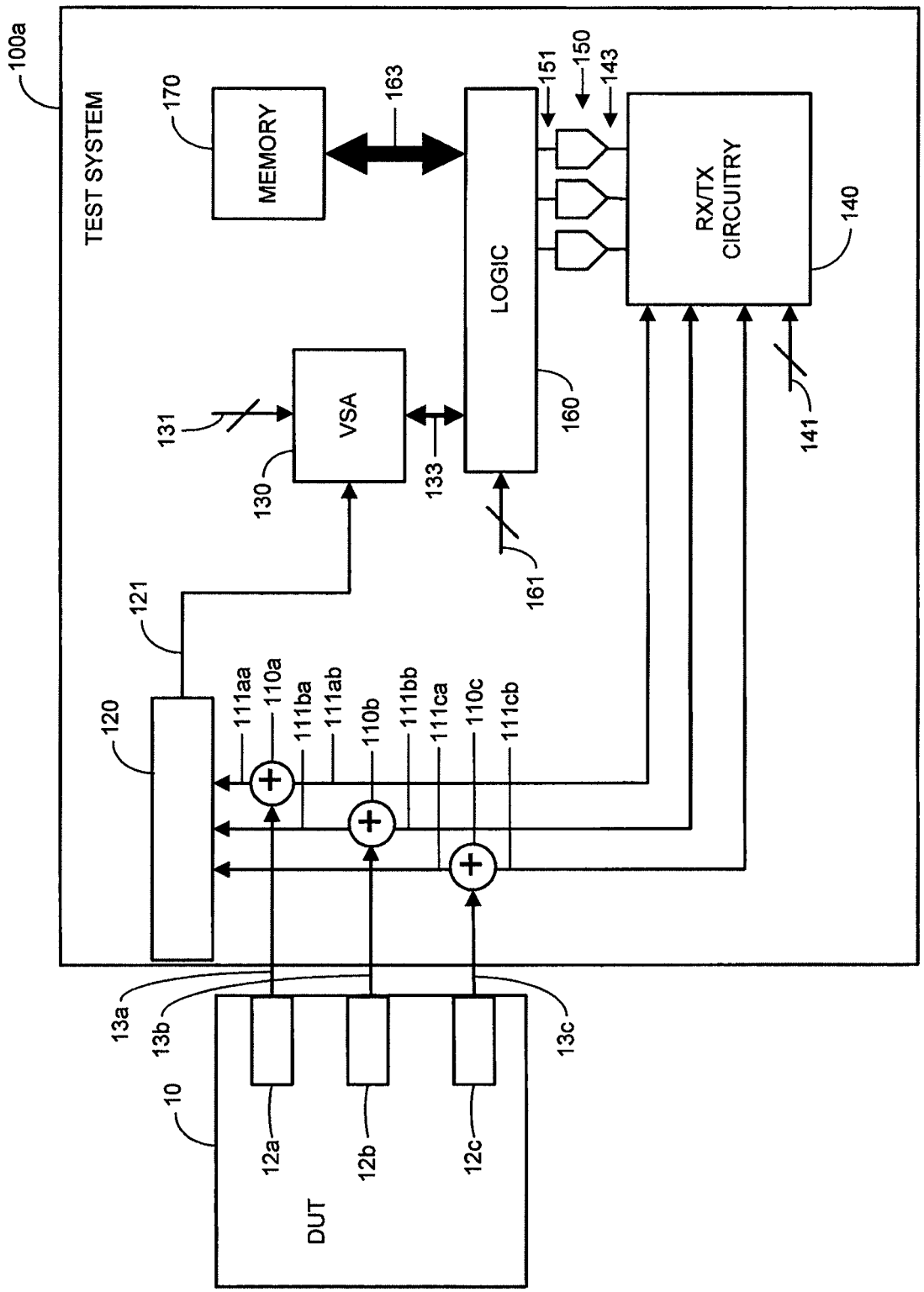
FIG. 3 depicts a test system for testing a MIMO DUT in accordance with an exemplary embodiment of the presently claimed invention.

Referring to FIG. 3, in accordance with one embodiment of the presently claimed invention, the test system 100*a* requires only one high performance VSA 130. The MIMO transmit signals from the MIMO device under test (DUT) 10, arriving via the wired signal paths 13*a*, 13*b*, 13*c*, are divided, or split, by corresponding signal dividing, or splitting, circuits 110*a*, 110*b*, 110*c*. One set of the resulting replica MIMO signals 111*aa*, 111*ba*, 111*ca* is provided to a power combining circuitry 120 while another set of replica MIMO signals 111*ab*, 111*bb*, 111*cb* is provided to integrated transceiver circuitry 140 (discussed in more detail below).

The power combiner 120 combines its input replica MIMO signals 111*aa*, 111*ba*, 111*ca* to produce a composite signal 121 for processing and analysis by the VSA 130, in accordance with VSA control signals 131 provided by a controller (not shown). Meanwhile, the other MIMO replica signals 111*ab*, 111*bb*, 111*cb* are provided to the transceiver circuitry 140 for processing (e.g., frequency down conversion, filtering, demodulation, etc.). Such transceiver circuitry 140 can be implemented using one or more integrated transceiver chips having multiple transceivers (with respective transmitters and receivers) that can operate in parallel, and are well known in the art. Such circuitry 140 is controlled in accordance with transceiver control signals 141 provided by a controller (not shown). The resulting processed signals 143 are converted by analog-to-digital (ADC) circuits 150, with the resulting digital signals 151 provided to logic circuitry 160 (discussed in more detail below). (Alternatively, the ADC circuits 150 can be included as part of the transceiver circuitry 140, in which case its processing need not include demodulation.) As a result, the single high performance VSA 130 and the significantly lower cost transceiver chip (or chips) in the transceiver circuitry 140 can function in a complementary manner to provide a set of MIMO transmit signal measurements virtually comparable to those of a multiple-VSA test system 30 (FIG. 2).

For example, the transceiver circuitry 140 can capture the individual MIMO signals 111*ab*, 111*bb*, 111*cb*, analyze them for power and compute various signal characteristics or parameters, such as the complementary cumulative distribution function (CCDF). The individual captured signals 151 provided by the transceiver circuitry 140, in conjunction with the composite signal analysis by the VSA 130 can provide (e.g., via processing within the logic circuitry 160) error vector magnitude (EVM) and spectral power density measurements of the composite signal 121, and the high performance VSA can measure the spectral mask of the signals 111*aa*, 111*ba*, 111*ca* transmitted by the DUT 10. Mutually supportive and complementary analysis functions can be performed within the logic circuitry 160 using analysis data 133 provided by the VSA 130 and the digitized signals 151 provided by the transceiver circuitry 140 and ADC circuits 150, in accordance with logic control signals 161 provided by a controller (not shown). The results can be stored in memory circuitry 170 via a memory interface 163, in accordance with well known techniques.

Figure 4:
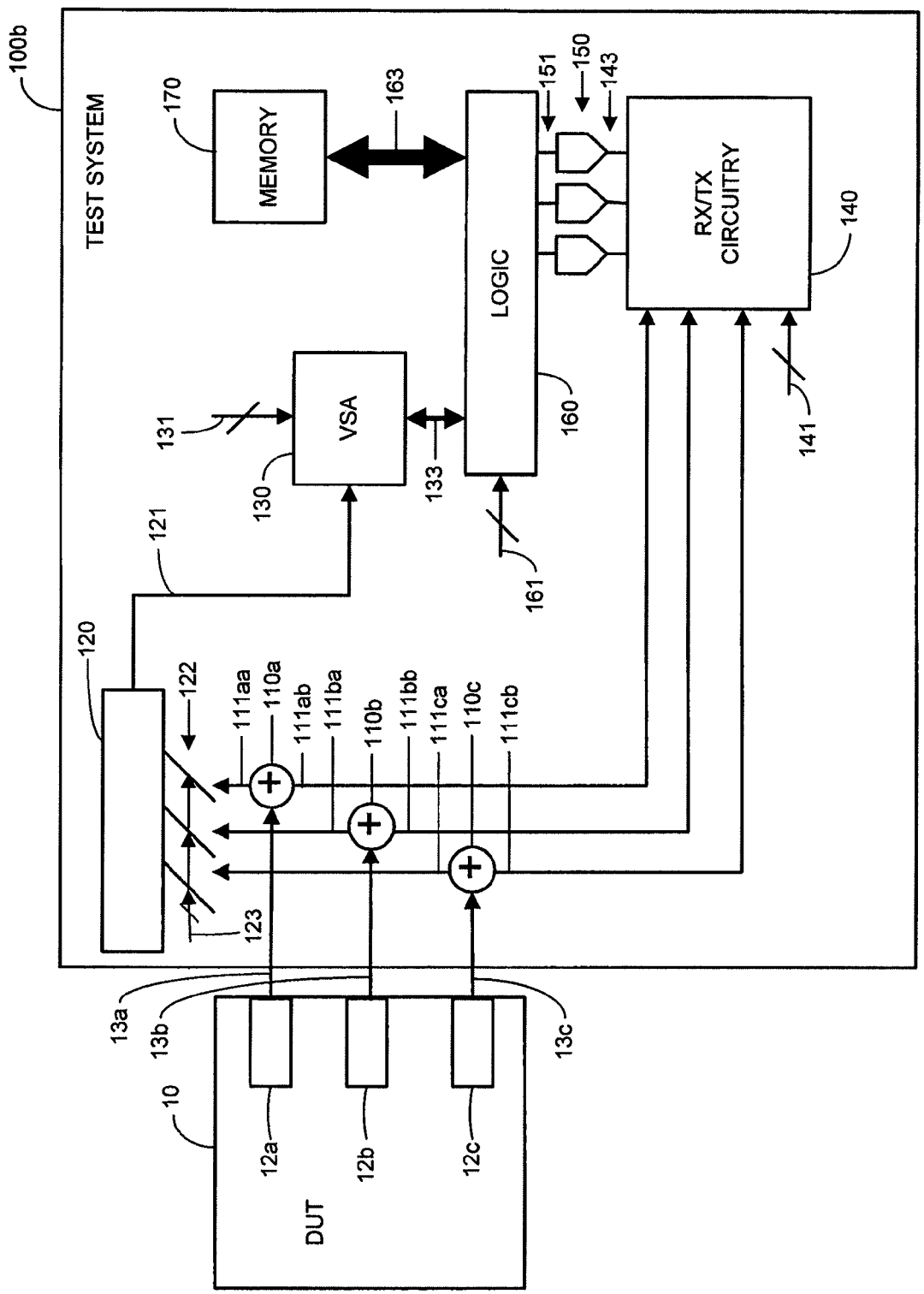
FIG. 4 depicts a test system for testing a MIMO DUT in accordance with another exemplary embodiment of the presently claimed invention.

Referring to FIG. 4, in accordance with an alternative embodiment, the test system 100*ba* includes signal switches 122 between the signal dividers 110*a*, 110*b*, 110*c* and power combiner 120. These switches 122, in accordance with one or more switch control signals 123 from a controller (not shown), allow the MIMO replica signals 111*aa*, 111*ba*, 111*ca* to be switched individually and provided individually as the signal 121 conveyed to the VSA 130 for measurements and analysis (e.g., for individual signal mask measurements). Under this kind of testing scenario, only one MIMO signal 111*aa*, 111*ba*, 111*ca*, passes through the signal combiner 120 and on to the VSA as the "combined" signal 121. (This type of testing scenario is best achieved when the input signal paths 13*a*, 13*b*, 13*c* are wired since an OTA configuration would not ensure reception of mutually distinct signals from the DUT transmitters 12*a*, 12*b*, 12*c*. Such wired connections can also be advantageously used to calibrate measurements of DUT signal power levels, e.g., by correcting for differences between power levels of the DUT signals 13*a*, 13*b*, 13*c*.)

Figure 5:
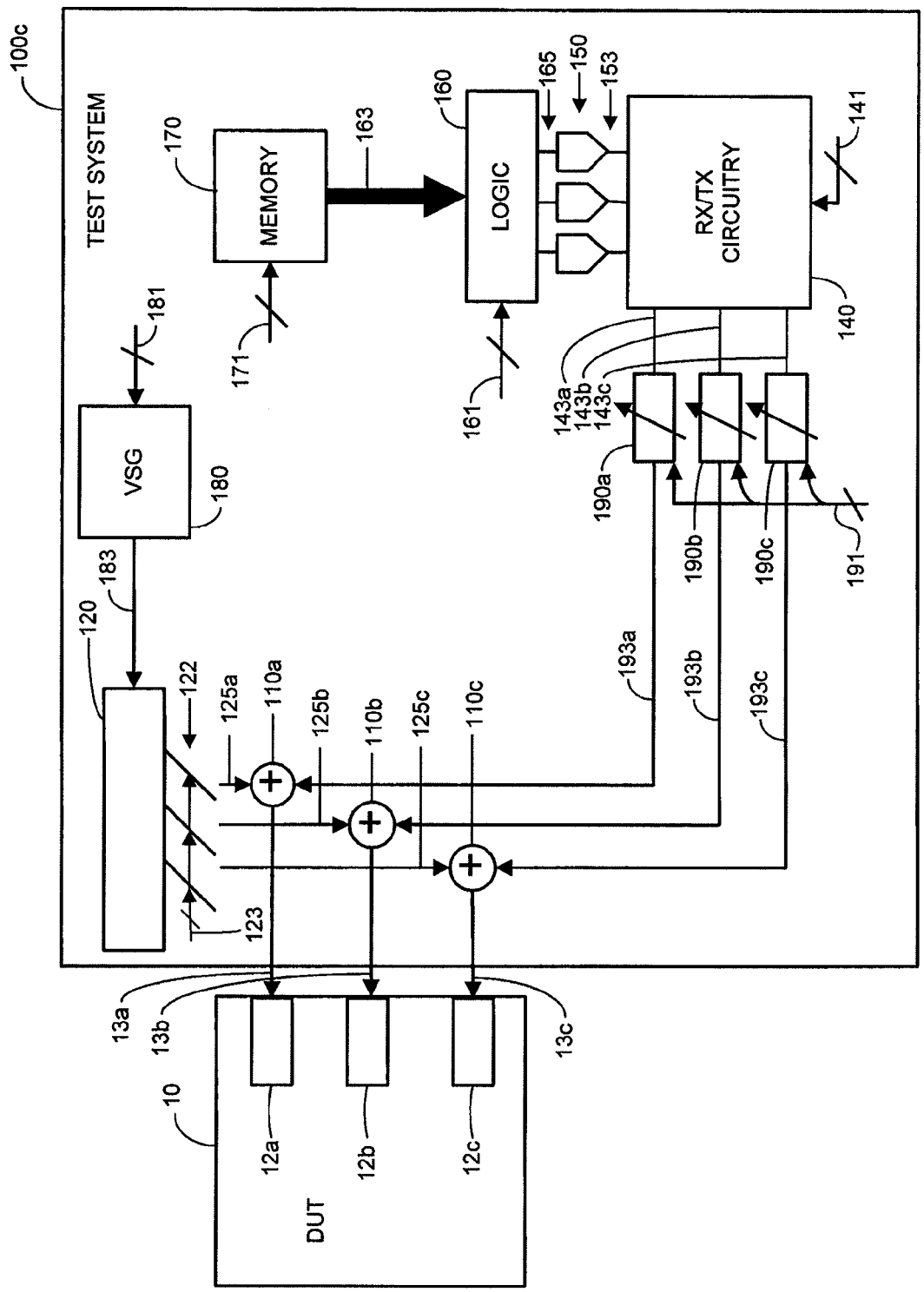
FIG. 5 depicts a test system for testing a MIMO DUT in accordance with another exemplary embodiment of the presently claimed invention.

Referring to FIG. 5, in accordance with another alternative embodiment, the test system 100*c* can include (also or instead) a vector signal generator (VSG) 180 which, in accordance with VSG control signals 181 from a controller (not shown), provides a transmit signal 183. This transmit signal 183 is divided, or split, by the reverse functionality of the power combiner 120 (in accordance with well known principals) and provided via the signal switches 122 to the input signal dividers 110*a*, 110*b*, 110*c*. (In accordance with well known techniques, these signal dividers 110*a*, 110*b*, 110*c*, when operating in the reverse direction, operate as signal combiners.) Accordingly, the transmit signal 183 can be provided to one or more of the signal combiners 110*a*, 110*b*, 110*c*, and conveyed via the signal paths 13*a*, 13*b*, 13*c* to the DUT transceivers 12*a*, 12*b*, 12*c* for testing of their receiver 12*a*, 12*b*, 12*c* operations.

Meanwhile, data stored in the memory 170, e.g., in accordance with memory control signals 171 from a controller (not shown), can be conveyed via the memory interface 163 to the logic circuitry 160. (The memory 170 can also be shared with the controller (not shown) and/or VSG 180.) In accordance with its control signals 161, the logic circuitry 160 can be caused to generate test data 165 for conversion by digital-to-analog conversion (DAC) circuits 150. The resulting analog signals 153 are frequency converted by the transmitter portion of the transceiver circuitry 140 in accordance with its control signals 141. The respective magnitudes of the resulting transmit signals 143*a*, 143*b*, 143*c* are controlled by signal attenuators 190*a*, 190*b*, 190*c* in accordance with attenuator control signals 191 from a controller (not shown). The resulting magnitude-controlled transmit signals 193a, 193b, 193c can be conveyed via the signal paths 13a, 13b, 13c to the DUT receivers 12a, 12b, 12c, via the output signal combiners 110a, 110b, 110c, individually or summed with one or more of the transmit signals 125a, 125b, 125c originating from the VSG 180. Additionally, if the VSA 130 (FIG. 4) is included as part of the test system 100c, it can be advantageously used to validate the power levels of the transceiver signals 193a, 193b, 193c (preferably with reduced levels of attenuation introduced by the signal attenuators 190a, 190b, 190c during validation).

With this test system embodiment 100c, the transceiver circuitry 140 also includes circuitry needed to produce true MIMO signals. The incoming analog signals 153 are modulated and frequency converted in accordance with well known principals to produce MIMO signals 143a, 143b, 143c. The magnitude-controlled signals 193a, 193b, 193c are conveyed to the DUT receivers 12a, 12b, 12c via the output signal combiners 110a, 110b, 110c and signal paths 13a, 13b, 13c. This enables the testing of whether the MIMO receivers 12a, 12b, 12c are capable of receiving true MIMO signals. Further, the signal switches 122 in conjunction with the high performance VSG 180 enable testing of the sensitivities of the DUT receivers 12a, 12b, 12c, and their combined sensitivity by testing for maximum ratio combining (MRC) and receive signal strength indication (RSSI).

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for testing a radio frequency (RF) multiple-input-multiple-output (MIMO) device under test (DUT), comprising:
    a plurality of RF signal ports to convey a corresponding plurality of MIMO signals, including a plurality of receive MIMO signals received from a DUT;
    signal routing circuitry coupled to said plurality of RF signal ports to provide
        a plurality of replica MIMO signals corresponding to said plurality of receive MIMO signals, and
        a composite signal including said plurality of receive MIMO signals;
    first signal processing circuitry coupled to said signal routing circuitry to provide one or more processed signals by processing at least one of
        said composite signal, and
        a first portion of said plurality of replica MIMO signals;
    signal conversion circuitry coupled to said signal routing circuitry to convert a second portion of said plurality of replica MIMO signals to provide one or more converted signals;
    second signal processing circuitry coupled to said first signal processing circuitry and said signal conversion circuitry to process said one or more processed signals and said one or more converted signals to provide test data indicative of one or more signal transmission performance parameters of said DUT.

2. The apparatus of claim 1, wherein said signal routing circuitry comprises:
    signal dividing circuitry to provide said plurality of replica MIMO signals; and
    signal combining circuitry coupled to said signal dividing circuitry to combine a third portion of said plurality of replica MIMO signals to provide said composite signal.

3. The apparatus of claim 1, wherein said signal routing circuitry comprises:
    signal dividing circuitry to provide said plurality of replica MIMO signals; and
    signal switching circuitry coupled to said signal dividing circuitry to switch among said second portion of said plurality of replica MIMO signals to provide said composite signal.

4. The apparatus of claim 1, wherein said first signal processing circuitry comprises a vector signal analyzer.

5. The apparatus of claim 1, wherein said signal conversion circuitry comprises:
    integrated RF signal receiver circuitry to convert said second portion of said plurality of replica MIMO signals to provide a corresponding plurality of analog conversion signals; and
    analog-to-digital conversion (ADC) circuitry coupled to said integrated RF signal receiver circuitry to convert said plurality of analog conversion signals to provide said one or more converted signals.

6. The apparatus of claim 1, wherein said second signal processing circuitry comprises computational logic circuitry.

7. The apparatus of claim 1, wherein:
    said plurality of MIMO signals further includes a plurality of transmit MIMO signals for transmission to said DUT;
    said apparatus further comprises
        first RF signal generating circuitry to provide a first portion of said plurality of transmit MIMO signals, and
        second RF signal generating circuitry to provide a RF transmit signal; and
    said signal routing circuitry is further coupled between said first and second RF signal generating circuitries and said plurality of RF signal ports to provide said plurality of transmit MIMO signals, wherein said plurality of transmit MIMO signals corresponds to one or more of
        said first portion of said plurality of transmit MIMO signals, and
        said RF transmit signal.

8. The apparatus of claim 7, wherein said signal routing circuitry comprises:
    first signal dividing and combining circuitry to provide said plurality of replica MIMO signals and said plurality of transmit MIMO signals; and
    second signal dividing and combining circuitry coupled to said first signal dividing and combining circuitry to
        combine a third portion of said plurality of replica MIMO signals to provide said composite signal, and
        provide at least a portion of said plurality of transmit MIMO signals related to said RF transmit signal.

9. The apparatus of claim 7, wherein said signal routing circuitry comprises:
    signal dividing and combining circuitry to provide said plurality of replica MIMO signals and said plurality of transmit MIMO signals; and
    signal switching circuitry coupled to said signal dividing and combining circuitry to
        switch among said second portion of said plurality of replica MIMO signals to provide said composite signal, and
        provide at least a portion of said plurality of transmit MIMO signals related to said RF transmit signal.

10. The apparatus of claim 7, wherein said first RF signal generating circuitry comprises integrated RF signal transmitter circuitry.

11. The apparatus of claim 7, wherein said second RF signal generating circuitry comprises a vector signal generator.

12. A method of testing a radio frequency (RF) multiple-input-multiple-output (MIMO) device under test (DUT), comprising:
 receiving, via a plurality of RF signal ports, a corresponding plurality of MIMO signals, including a plurality of receive MIMO signals, from a DUT;
 routing said plurality of receive MIMO signals from said plurality of RF signal ports to provide
  a plurality of replica MIMO signals corresponding to said plurality of receive MIMO signals, and
  a composite signal including said plurality of receive MIMO signals;
 providing one or more processed signals by processing at least one of
  said composite signal, and
  a first portion of said plurality of replica MIMO signals;
 converting a second portion of said plurality of replica MIMO signals to provide one or more converted signals;
 processing said one or more processed signals and said one or more converted signals to provide test data indicative of one or more signal transmission performance parameters of said DUT.

13. The method of claim 12, wherein said routing said plurality of receive MIMO signals from said plurality of RF signal ports comprises:
 dividing said plurality of receive MIMO signals to provide said plurality of replica MIMO signals; and
 combining a third portion of said plurality of replica MIMO signals to provide said composite signal.

14. The method of claim 12, wherein said routing said plurality of receive MIMO signals from said plurality of RF signal ports comprises:
 dividing said plurality of receive MIMO signals to provide said plurality of replica MIMO signals; and
 switching among said second portion of said plurality of replica MIMO signals to provide said composite signal.

15. The method of claim 12, wherein said converting a second portion of said plurality of replica MIMO signals to provide one or more converted signals comprises:
 converting said second portion of said plurality of replica MIMO signals with integrated RF signal receiver circuitry to provide a corresponding plurality of analog conversion signals; and
 performing analog-to-digital conversion of said plurality of analog conversion signals to provide said one or more converted signals.

16. The method of claim 12, wherein:
 said plurality of MIMO signals further includes a plurality of transmit MIMO signals for transmission to said DUT;
 said method further comprises
  generating a first plurality of RF signals to provide a first portion of said plurality of transmit MIMO signals, and
  generating a RF transmit signal; and
 routing said first portion of said plurality of transmit MIMO signals and said RF transmit signal to provide said plurality of transmit MIMO signals, wherein said plurality of transmit MIMO signals corresponds to one or more of
  said first portion of said plurality of transmit MIMO signals, and
  said RF transmit signal.

17. The method of claim 16, wherein said routing said first portion of said plurality of transmit MIMO signals and said RF transmit signal comprises:
 selectively dividing and combining said plurality of receive MIMO signals, said first portion of said plurality of transmit MIMO signals and said RF transmit signal provide said plurality of replica MIMO signals and said plurality of transmit MIMO signals; and
 selectively dividing and combining a third portion of said plurality of replica MIMO signals and said RF transmit signal provide said composite signal and at least a portion of said plurality of transmit MIMO signals.

18. The method of claim 16, wherein said routing said first portion of said plurality of transmit MIMO signals and said RF transmit signal comprises:
 selectively dividing and combining said plurality of receive MIMO signals, said first portion of said plurality of transmit MIMO signals and said RF transmit signal provide said plurality of replica MIMO signals and said plurality of transmit MIMO signals; and
 switching among said second portion of said plurality of replica MIMO signals and said RF transmit signal to provide said composite signal and at least a portion of said plurality of transmit MIMO signals.

* * * * *